United States Patent [19]

Powell

[11] 4,445,531

[45] May 1, 1984

[54] PILOT FOR SAFETY VALVE

[75] Inventor: Walter W. Powell, Houston, Tex.

[73] Assignee: Anderson, Greenwood & Co., Houston, Tex.

[21] Appl. No.: 290,231

[22] Filed: Aug. 5, 1981

[51] Int. Cl.³ ............................................. F16K 31/36
[52] U.S. Cl. ..................................... 137/489; 137/492; 137/557
[58] Field of Search ...................... 137/489, 492, 492.5, 137/557

[56] References Cited

U.S. PATENT DOCUMENTS

| 3,406,671 | 10/1968 | Weise | 137/489 X |
| 3,699,991 | 10/1972 | Munch | 137/557 X |
| 4,203,467 | 5/1980 | Cardi | 137/557 |
| 4,285,362 | 8/1981 | Taylor | 137/489 |

OTHER PUBLICATIONS

Agco, "Safety Relief Valves", Anderson, Greenwood & Co., Catalog 1531, Jul. 1980.

Primary Examiner—Alan Cohan

[57] ABSTRACT

For use with a safety relief valve, a pilot valve is disclosed. The preferred and illustrated embodiment of the pilot valve incorporates a pressure moved spindle within a housing, the housing being drilled and incorporating a valve and valve seat mechanism. The device is adapted to be connected to a high pressure inlet source. In addition, it has a flow path from the inlet through a needle orifice. This needle orifice chokes the flow into an outlet port. The outlet is provided for controlling a safety relief valve. A third path past the valve element is included which conducts fluid to an exhaust port. A coil spring forms a force in one direction for the valve element while the inlet line pressure forms a force in the opposite direction. When the inlet pressure is sufficiently high, the valve element is moved, thereby opening the valve. This embodiment is enhanced by indicating the operative position which is monitored by a pressure driven differential area piston having a protruding plunger which provides an output indication indicative of the operative state of the valve.

13 Claims, 3 Drawing Figures

PILOT FOR SAFETY VALVE

BACKGROUND OF THE DISCLOSURE

This disclosure is directed to a valve structure to be used at relatively high pressures. The pilot valve of this disclosure is installed with and connected to a safety relief valve. It operates the safety relief valve. The safety relief valve is one which is adapted to releasably blow down a very high pressure source. For instance, the device can be used with inlet pressures of perhaps 6,000 psi or so. As the inlet pressure to the safety relief valve rises, the pressure approaches the level for the pilot valve to trip it. The pilot valve of this invention is particularly adapted to respond to this inlet pressure. It controls pressure in an outlet line which is connected to the safety relief valve. The safety relief valve is thus operated in the required manner to thereby open the safety relief valve. This control pressure opens the safety relief valve when it exceeds the preset pressure and holds it open until the inlet pressure returns to the preset level.

It is important to know the operative state of the pilot valve. The operative state is determined by several factors. While a few of them are scale factors that are intrinsically built into a given device, it is just as important to note that the factors controlling operation of the pilot valve create a need for the pilot valve to track a moving target, so to speak. It will be appreciated that the device is used over a wide range of relatively high pressures. For instance, it can be installed to monitor pressures in the range of 1,500 to 6,000 psi. Consider, as an example, operation of the pilot valve at inlet levels of this sort. The device is able to track inlet pressures up to the set level within the specified range. The outlet pressure also tracks with the inlet pressure. In other words, once a selected inlet pressure has been determined, the outlet pressure is a percentage of this pressure as reflected by the pressure levels in the outlet line. The outlet line is delivered to the safety relief valve, and provides a fluid signal for operation of the pressure relief valve. This can be accomplished even though the fluid of interest flowing through the safety relief valve is a gas or liquid.

The device of this disclosure optionally includes an indicated output signal at a plunger to verify the operative state of the valve. If the valve is open to exhaust fluid to the exhaust port, thereby dropping the outlet line pressure, this pressure pulse signal is applied to the safety relief valve to trigger operation of that valve.

Many objects and advantages of the present invention are provided in the fashion to be described hereinbelow. This pilot valve is particularly adapted to be used with a safety relief valve of the sort disclosed in application Ser. No. 290,252 which was filed on the common filing date of this disclosure and by the common inventor. That disclosure is hereby incorporated by reference into the present disclosure. Such a valve is also shown at page 4 of Catalog 1531 of Anderson, Greenwood & Co., 1980.

DETAILED DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED AND ILLUSTRATED EMBODIMENT

In the disclosure which is incorporated by reference, a safety relief valve is disclosed. The safety relief valve incorporates a piston. The inlet pressure tends to force the piston open at a face. This is opposed by a force applied to another face of the piston. The second force is formed by the controlled or outlet pressure from the pilot valve. This second force tends to close the piston. Closure is accomplished when the controlled pressure acting on an enlarged face on the piston overcomes all opening forces. This force is sufficient to keep the safety relief valve closed until the inlet pressure increase causes opening of the pilot valve. When that occurs, the safety relief valve opens to drop its inlet pressure. The safety relief valve thus comprises cooperative structure. The safety relief valve is thus controlled by the pilot valve and to this end, there are two lines extending between the two valves. The first is the inlet line which is the inlet pressure applied to the safety relief valve and which is also applied at the inlet of the pilot valve. The second line conducts the controlled pressure from the pilot valve to the safety relief valve. This comprises the output signal of the pilot valve.

Figure 1:
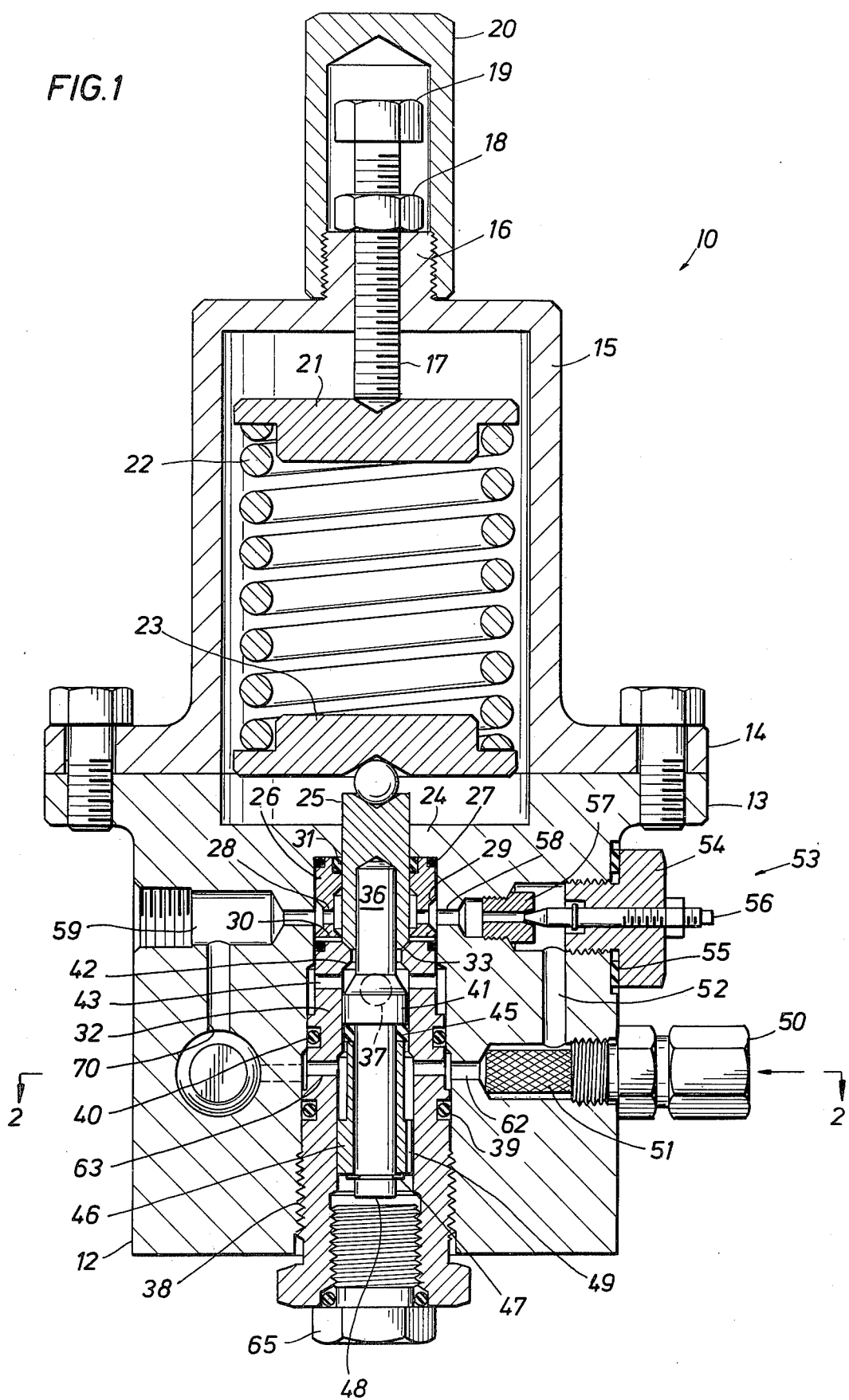
FIG. 1 is a sectional view through the pilot valve of the present disclosure showing details of construction.

Going directly to FIG. 1 of the drawings, the numeral 10 identifies a pilot valve constructed in accordance with the teachings of this disclosure. This device incorporates a valve body 12. The valve body includes a peripheral flange 13, and this flange is spaced immediately adjacent to a matching flange 14 attached to the lower edge of a bonnet 15. The bonnet 15 is secured over the body 12. The bonnet is held in position by a set of flange bolts threaded through suitably spaced openings around a bolt circle in the flanges.

The bonnet 15 incorporates a central upstanding threaded stub 16 which is hollow to receive a bolt 17. The bolt 17 terminates at a head and receives a nut 18 on it. The head 19 is above the nut 18, and they are both enclosed within a cap 20.

As the bolt is threaded or unthreaded, it is selectively locked in position with the lock nut 18 and moved upwardly or downwardly by threaded movement. The threaded bolt 17 abuts an upper washer 21 which captures a coil spring 22 therebelow. The washer 21 slightly penetrates the coil spring and seats against it. A similar washer 23 is located at the bottom of the coil spring. The two facing washers are similarly constructed and differ only in position. They capture the coil spring 22 to align the coil spring for applying an axial force to the valve to be described. This force is opposed in operation of the pilot valve 10 in a manner to be described.

The valve body 12 is axially drilled to form a lengthwise passage. This passage receives the working components which are shown in FIG. 1. The drilled hole includes a transverse shoulder at 24 which encircles a movable stem 25. The stem 25 is forced downwardly by the spring 22. The spring force is applied to the stem through a sphere captured at the end of the stem on a dimple, this being utilized to apply the force in a linear fashion. This prevents canting of the stem in the event force is applied at an angle.

The stem 25 passes through an opening adjacent to the shoulder 24. The shoulder 24 is adjacent to a cylindrical thimble 26. The thimble 26 supports a seal at 27 to prevent leakage along the outer face and a similar seal protects leakage along the inner face. Moreover, the thimble aligns around the movable stem. The stem 25 is able to slide while the thimble is held in a fixed location in the manner to be described. The thimble is perforated at 28, the perforations extending radially through the thimble. The exterior face of the thimble is cut with a surrounding groove 29. The groove enabling fluid in the valve to flow around the thimble and across the valve body as shown in FIG. 1. More will be said regarding this flow path. The flow path is constrained by a seal 31 on the interior of the thimble 26.

The thimble has a lower face 30 which is a transverse shoulder. The shoulder 30 defines the lower end of the thimble as shown in FIG. 1. The thimble 26 faces a hollow movable valve seat assembly 32. A soft flat washer inserted adjacent to the shoulder 30 increases seal quality as will be noted below. The valve seat assembly 32 is a cylindrical hollow body which is positioned in the drilled passage just below the thimble. The valve seat assembly is cylindrically hollow. It has a transverse upper face opposite to the face 30. Moreover, it is chamfered at 33 to define a valve seat on the seat assembly. The surface 33 is cut at an angle to confront a matching surface of the stem 25. The lower portion of the stem thus functions as the valve element which moves into contact with the valve seat at 33 to close the pilot valve 10. The face of the stem which conforms to the face 33 is at the lower end of the stem. The stem is a separable element mounted on a spindle 36. The spindle 36 moves the stem upwardly, clearing the valve seat 33 for flow. The flow path utilizes the radial passages 28 through the thimble, assuming that the stem moves off the seat 33. The seal captured adjacent to the face 30 seals against the tapered seat 33 on the stem 25 in the closed state to enhance selective closure of the valve.

The valve seat assembly 32 fits around the spindle. However, it does not fit snugly and thereby defines a flow path downwardly past the tapered face 33. This flow path extends downwardly into the valve seat area and in communication with an exhaust port 37 shown in dotted line. The port 37 exits through the valve body 12 on the obscured face. The port 37 comprises a radial passage from the center of the valve body to the exterior face, preferably being tapped to receive a threaded fitting, and thereby void exhaust fluid to an exhaust line. Whatever the case, the port 37 is in a fluid path which is communicated axially along the outside face of the spindle 36.

The valve seat is captured. It comprises an elongate valve seat assembly which is threaded at 38 to the valve body. The valve seat assembly 32 is cut with a groove to enable an O-ring 39 to seal against leakage in that direction. A similar O-ring 40 is located parallel to the O-ring 39 to form a second seal. The two seals are on the exterior of the valve seat assembly 32.

The valve seat assembly 32 additionally incorporates an internal drilled passage which is somewhat larger than the upper portions of the spindle 36. The spindle is permitted to move upwardly. As it moves upwardly, an enlargement on the exterior 41 centers and guides the spindle. This enlargement is large, sufficiently so that it guides the spindle in upward movement. The spindle 36 thus moves upwardly, forcing the stem 25 upwardly. The spindle has a range of movement dependent on the gap between the enlargement 41 and an internal shoulder 42. The shoulder 42 is on the backside of the chamfer 33, and suitable passages are drilled at 43 to permit pressure equalization between the interior and the exterior of the valve seat assembly.

The enlargement 41 has a tapered upper face. The lower edge of the enlargement is transverse to receive an abutting seal 45. The seal 45 prevents leakage along the movable spindle. This seal is captured between the abutting enlargement 41 above and a lower seal locking sleeve 46. The sleeve 46 telescopes onto the spindle from the bottom and jams the seal ring 45. It locks the seal ring against the shoulder. Moreover, it is enlarged at the lower portions to guide the spindle. This prevents the spindle from wobbling. The sleeve 46 is fixed in location by means of a snap ring 47. The sleeve 46 is hex stock partly turned to remove some metal leaving one or more lengthwise flats defining a flow path, the passage being identified by the numeral 49. The spindle incorporates a lower face 48. The face 48 defines a working face or area against which high pressure fluid is introduced to operate the valve. The actual area includes the area to the outer diameter of the seal 45. To obtain balanced forces acting on the movable valve elements, the area of the seal 45 matches the area of the face 33. Also, the inner diameter of the seal 31 matches the outer diameter of the seal 45.

As described to this juncture, the movable components in the center of FIG. 1 include a transverse passage extending from right to left as FIG. 1 is viewed utilizing the radial passages 28. The numeral 37 identifies the exhaust port. In the deployment of FIG. 1, the exhaust port 37 is isolated above and below. A flow route is defined above, this being the path of the control pressure. The inlet or high pressure is isolated from the exhaust port 37. When the spindle 36 is forced upwardly by inlet pressure (the maximum pressure observed in the pilot valve 10), the exhaust port is then exposed to the control pressure. It is selectively opened to the control pressure to drop the control pressure. All of these connections will be described in relating the various flow paths to the fittings of the pilot valve 10.

DESCRIPTION OF THE VARIOUS FLOW PATHS

In FIG. 1 of the drawings, the numeral 50 identifies an inlet pressure port fitting. The port 50 is equipped with suitable tapped fittings to deliver inlet fluid under pressure. The fluid flows through the fitting 50 and into a suitable strainer 51.

The inlet pressure is then provided to two different paths. The first path utilizes the lateral passage 52. The passage 52 delivers inlet pressure to a needle orifice. This is the assembly generally indicated at 53. The needle orifice assembly utilizes a tapped opening in the body. A threaded fitting 54 is joined to the valve body, clamping a gasket 55 to prevent leakage. The gasket 55 is on the exterior of the valve body and below the tapped fitting 54. The fitting 54 supports an adjustable needle valve 56, this being threaded to the fitting 54. A lock nut secures it in position. The needle valve 56 includes a tapered point. It moves into an axial opening in a valve seat 57. The valve seat 57 is axially drilled and threaded on the exterior. It is threaded into a lateral passage which is drilled in the valve body. For ease of assembly, the valve body is drilled from one side to the other as shown in FIG. 1. Moreover, this hole is countersunk at several locations to provide shoulders. One such shoulder is used to locate the valve seat 57.

The needle orifice 53 thus connects to a passage 58 which communicates directly to the exterior of the thimble 26 previously identified. This delivers fluid under pressure to the exterior of the thimble. Fluid flows around the thimble on the exterior. On the opposite side, the fluid flow passes through a similar radial passage. It flows into a tapped port 59, this port being described as the control or output port. A threaded fitting is readily received in this port and a fluid line extends from there to the safety relief valve for operation of the safety relief valve. This line is directly connected to the safety relief valve to cause the safety relief valve to close when the control pressure is high and to open when the control pressure is low. The groove around the external surface of it simply routes the controlled pressure around the thimble. It will be recalled that this groove also opens into the radial passages 28 opening to the interior of the timble. With the valve in the closed position of FIG. 1, there is no flow through the radial passages 28. Accordingly, the flow path from the needle orifice assembly 53 is to the outlet port 59. This control path is not closed even when the valve is opened.

The path just described is ordinarily isolated when the pilot valve 10 is closed. When the stem 25 moves upwardly, it clears the valve seat 33. This opens the exhaust port 37 to the fluid in the control passage. The branched flow path is then through the radial passage 28 to the interior of the thimble 26. The fluid flows downwardly as viewed in FIG. 1 past the face 33 to the port 37. The port 37 is adjacent the tapered enlargement 41 but this enlarement does not block the exhaust port 37. The flow is into the exhaust port 37 and to the exterior. As mentioned before, the exhaust port 37 can be connected to a safety or flare line to dispose of the fluid as desired. Exhaust port back pressure is presumably relatively low, at least sufficiently that it does not interfere with operation of the pilot valve. The exhaust port back pressure is normally no factor in valve operation even to about 95% back pressure, because the valve is balanced in operation.

Going back now to the high pressure inlet at the port 50, it will be observed in FIG. 1 that the flow path also includes a radially directed passage 62. It is radial to intersect the valve seat assembly 32. It intersects between the seal rings 39 and 40. The high pressure fluid flows through a radial passage 63 to the interior of the valve seat assembly 32. This enables the high pressure fluid to flow in the space between the upper seal ring 45 and a plug 65 threaded into the bottom of the valve seat assembly 32. The plug 65 defines an internal chamber for receiving fluid under pressure to act against the lower parts of the spindle 36 to force it upwardly. The effective area of the spindle 35 and the seal 45 is the area defining the pressure created force. The spindle 36 is thus forced upwardly by a force which is proportional to the inlet pressure. As will be recalled, the inlet pressure is the pressure sensed by the safety relief valve prior to dumping. This pressure acts on the pilot valve 10 to selectively open the pilot valve.

DETAILED DESCRIPTION OF THE INDICATOR APPARATUS

Figure 2:
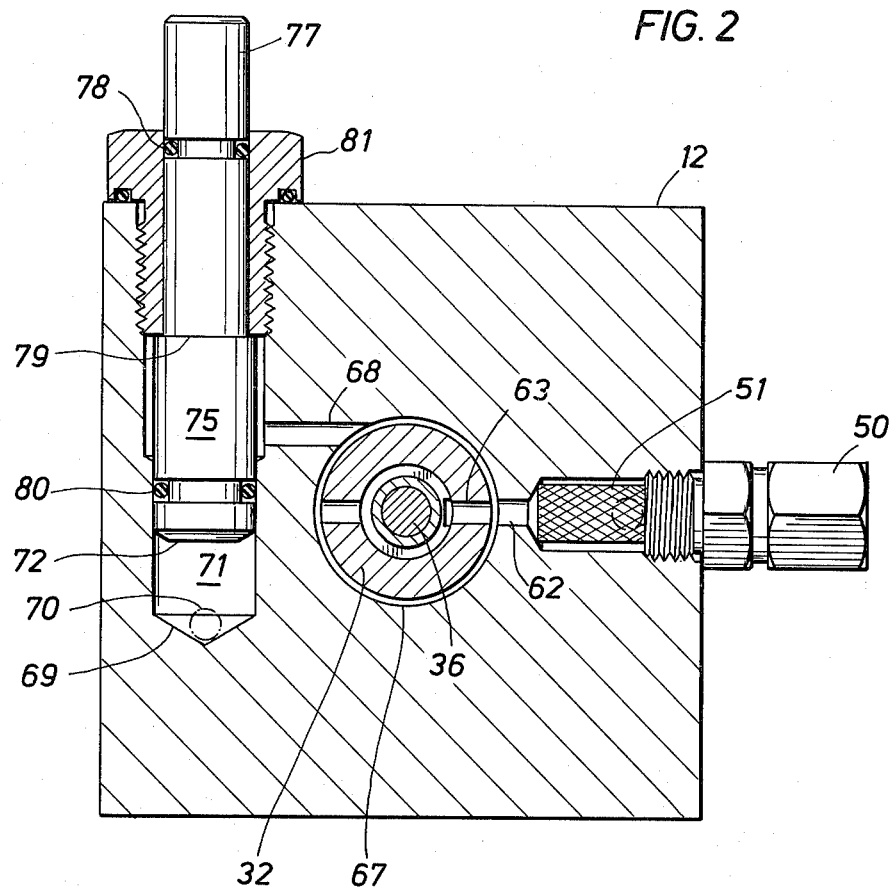
FIG. 2 is a sectional view along the line 2—2 in FIG. 1 showing details of construction of an indicator.

Attention is next directed to FIG. 2 of the drawings. This discloses the valve body 12 in sectional view. The inlet port 50 is shown at the right. It delivers fluid under pressure through the passage 62 previously described. This passage opens into the internally drilled hole through the valve body 12. That hole is identified at this elevation in the valve body by the numeral 67. The valve seat assembly 32 is sufficiently small in diameter that it defines an external flow path. The numeral 63 identifies the radial passages in the valve seat assembly 32. FIG. 2 further shows the spindle 36 at the center of the passage 67.

The numeral 68 identifies a passage drilled from the passage 67 to the side. FIG. 2 shows a rather large hole drilled from the top edge of the valve body. This passage terminates at 69, sufficiently deep that it is able to communicate with a vertical passage 70. The passage 70 is also shown in FIG. 1 of the drawings connected with the outlet port 59. The passage 70 delivers the outlet or control pressure into the chamber 71. It acts against the face 72 of a piston 75. The piston 75 is driven upwardly in FIG. 2 by the pressure introduced into the chamber 71. This is the control pressure which acts on the face 72. The piston 75 is thus forced upwardly by a force given by multiplying the pressure in the chamber 71 by the surface area 72. There is an opposing force to be described.

The piston 75 supports a plunger 77. The plunger extends to the exterior to serve as an indicator. It is in the up position as shown in FIG. 2. Leakage along the plunger is prevented by seal 78.

The plunger incorporates a shoulder 79. The shoulder is opposite the end face 72. The shoulder 79 is exposed to the inlet pressure. The route for the inlet pressure is shown in FIG. 2 to extend from the inlet port 50 to the face 79. The force on the face 79 is thus given by the product of the area 79 multiplied by the pressure applied in that area. It will be appreciated that the inlet pressure is isolated against the face 79 and does not leak downwardly, this being prevented by a seal 80. The seal 80 thus defines a lower chamber exposed to the control pressure and an upper chamber exposed to the inlet pressure.

The plunger extends through a hollow threaded fitting 81 which secures the plunger in position. It is hollow to enable the plunger to extend to the exterior and slide. Sliding movement of the plunger provides the necessary indication of the operative state of the device.

SYSTEM OPERATION

Figure 3:
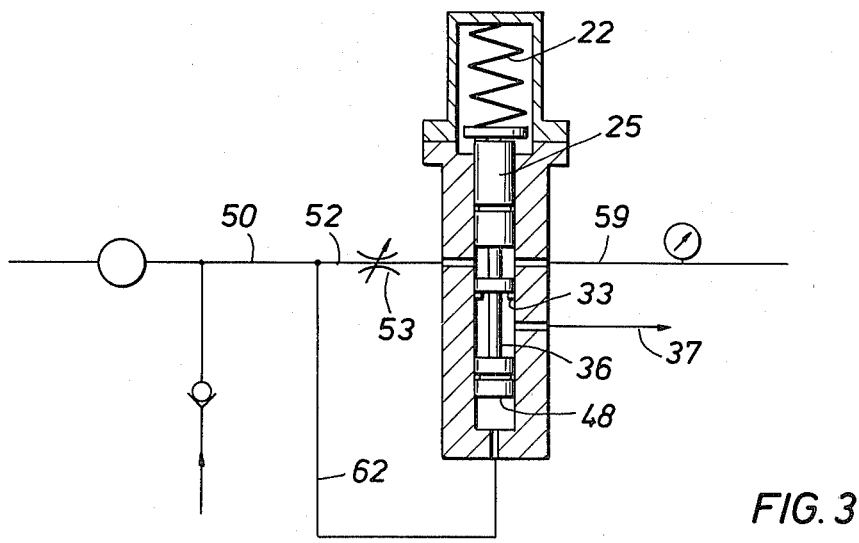
FIG. 3 is a schematic diagram of the passages within the pilot valve of this disclosure showing the method of operation thereof which has been simplified by the omission of certain components from FIG. 1.

For a better understanding of the device, attention is directed to FIG. 3. FIG. 3 incorporates various conduits shown in schematic form. To this end, the inlet port 50 is shown in FIG. 3. It is upstream of the passage 52 which delivers the inlet pressure to the needle orifice assembly 53. The alternate path includes the passage 62 which directs inlet pressure to the face 48 at the lower end of the spindle 36. The spindle 36 is shown in schematic fashion in FIG. 3. The spindle, in the downward location, accomplishes a seal at the chamfered face 33 which is also illustrated. The exhaust port 37 is likewise shown in schematic form.

The inlet pressure flows through the port 50 and through the needle orifice assembly 53. It also flows through the control port 59 on the right of FIG. 3. The spindle 36 is able to move upwardly, shifting the stem 25. The stem is thus exposed to opposing forces. It is moved upwardly by fluid pressure applied at the lower end. It is forced downwardly by the coil spring 22. These two forces are balanced by adjusting the spring. The stem and spindle move as a unit unaltered by variations in dome pressure or exhaust line pressure. When desired, the spring is adjusted to specify the pressure at which the valve components move upwardly in FIG. 3.

Operation of the pilot valve 10 is best understood by referring to FIG. 3 of the drawings. Assume a relatively simple sequence of operation, namely the situation where the safety relief valve is originally closed. In that event, the inlet pressure applied at the line 50 is the pressure sensed at the input of the safety relief valve. The pressure on the control line 59 is raised, at least adequately high to maintain the safety relief valve element in the closed position. In the co-pending disclosure which is incorporated by reference, that is referred to as the dome pressure inasmuch as the control line is connected to a dome cavity above a piston. The piston is forced into the closed position by applying the dome pressure to a relatively large area on that piston. The piston is forced open by line pressure which acts against a relatively smaller surface area on the piston.

Assume further that this beginning condition is maintained until the inlet pressure at the safety relief valve rises to a condition requiring dumping. This occurs in the following manner. As that pressure is approached, the force acting on the spindle 36 increases to the point that it moves the stem 25 upwardly. When the stem moves upwardly, it clears the valve seat 33. The valve element then opens to open the exhaust port 37. Up to this point, the pressure through the control port had been adequate to hold the safety relief valve closed. Whatever that pressure is prior to opening of the exhaust port, the control pressure is dropped as the exhaust port dumps the pilot valve control line. The pressure at the control port 59 drops markedly, and this drop continues as long as the exhaust port is cleared for fluid flow. While additional pressure fluid will pass through the needle orifice 53 at a rate dependent on the setting of the needle valve, the pressure in the control line continues to drop. It drops sufficiently to enable the safety relief valve to open. At the point when pressure begins to open the pilot valve 10, any incremental increase in pressure produces an incremental drop in pressure at the control line which is disportionate. For instance, in a given scale of the valve 10, an increase of one or two psi will produce a change in control line pressure of perhaps ten or twenty psi. The increased pressure at the valve produces a decreased pressure at the control line. There is a tendency of the valve to accelerate opening as the threshold pressure is approached and then exceeded. This is manifested by observing control line pressure as a function of inlet pressure which changes in the described manner.

The safety relief valve remains open for an interval, this inverval being sufficient to drop the inlet pressure. The pressure at the inlet of the safety relief valve is dropped until the pilot valve partially of fully closes. This is accomplished in the following manner. Venting through the safety relief valve causes the inlet pressure to drop. As that occurs, the force applied to the face 48 which moves the spindle and stem upwardly is then reduced. At it reduces, the spring force eventually overcomes this waning force and moves the valve elements downwardly toward a closed position. The stem 25 moves toward the tapered face 33 and eventually closes off the exhaust port 37. Until this closure actually occurs, pressure in the control line drops. When the exhaust port 37 starts closing, pressure in the control line then starts rising. Control line pressure rises at a rate dependent on the volume of the control line and the opening of the needle valve assembly 53. The rate of control line pressure increase is dependent on needle valve adjustment at 56. This restores the control pressure to a relatively high level over a period of time, usually a few seconds. As this occurs, this control pressure applied to the safety relief valve increases and thereby closes the safety relief valve. Closure is dependent on the rate of pressure increase in the control line and the safety relief valve operating conditions.

While the pilot valve has been described as opening and shutting, it may routinely maintain a partially open position for an indefinite period. This may occur when the safety relief valve vents a pressure near the set point pressure. In that instance, the pilot valve will open to some intermediate position (not fully open) and move only fractionally between different open positions at a rate dependent on system damping. This poses no particular problem in use of the pilot valve 10.

Operation of the valve in conjunction with the position indicator will likewise be noted. FIG. 2 shows the indicator in the extended position. It moves to a retracted position on operation of the valve. Thus, the plunger 77 indicates that the pilot valve 10 is closed, not flowing through the exhaust port. When the valve does open, the plunger is moved. The forces applied to the plunger are reversed. The larger force, in the view of FIG. 2, originally forces the plunger upwardly to the extended position. The force acting on the lower face 72 is reduced, thereby enabling the plunger to move downwardly. When it moves downwardly, it retracts with the piston 75. This retracted position is achieved when the pilot valve 10 opens to the exhaust port and is maintained as long as the valve 10 vents or dumps. When the valve 10 does close the exhaust port 37, the plunger is then re-extended to the full line position of FIG. 2.

It will be appreciated that the valve 10, described to this juncture, functions with a very minimum area. It is, therefore, able to control the safety relief valve with extremely high pressures, up to several thousand psi. Moreover, the sole upward force is the extremely high pressure applied to the lower end of the spindle at 48.

Various and sundry scale factors can be adjusted to control the device. As an example, the ratio between the areas 72 and 79 of the plunger can be varied. This ratio of areas is significant in adjusting the relative trip points of the indicator means. Moreover, this ratio is preferably related to the setting of the pilot valve 10 in the following manner. This ratio is calculated such that the plunger 77 is extended as shown in FIG. 2 when the exhaust port is closed and it retracts when the exhaust port opens.

While the foregoing is directed to the preferred embodiment, the scope is determined by the claims which follow:

I claim:

1. A pilot valve for control of a safety relief valve which safety relief valve exposed to an inlet pressure wherein the inlet pressure is selectively relieved by operation of the safety relief valve and wherein the pilot valve controls the safety relief valve by selectively applying control pressure to the safety relief valve to close the safety relief valve and by selectively reducing the control pressure to open the safety relief valve, the pilot valve comprising:

(a) a pilot valve body having a chamber therein;
(b) a valve seat in said valve body chamber;
(c) a movable piston means selectively closing against said valve seat in said valve body and incorporating a transverse face thereon adapted to be exposed to the inlet pressure and further incorporating a second and opposing face adapted to be acted against by a resilient means;
(d) first means for introducing fluid through an inlet line at a pressure determined by the inlet pressure for the safety relief valve, said first means placing pressure on said piston means in such a manner as to provide opposing forces acting on said piston means which forces tend to open or close said piston means relative to said valve seat;
(e) an outlet line from said pivot valve extending to the pressure relief valve to conduct control pressure to the pressure relief valve for control of opening and closing of said pressure relief valve; and
(f) indicator means responsive to pressure in said inlet line and said outlet line for forming an indication of the operative state of said piston means of said pilot valve wherein said indicator means includes:
  (1) a cylinder formed in said valve body;
  (2) a piston slidably in said cylinder;
  (3) a first area on said piston adapted to be exposed to a first pressure;
  (4) a second area on said piston, said second area opposing said first area and further being adapted to be exposed to a second pressure acting on said second area;
  (5) first and second flow line means in said body for applying the pressures in the inlet line and the control pressure in the outlet line to the first and second areas of said piston respectively; and
  (6) guide means for guiding said piston between first and second positions wherein the movement between said positions indicates the relative operative state of the pilot valve in a pressure dependent relationship.

2. The apparatus of claim 1 wherein said pilot valve includes three ports and wherein said three ports comprise:
(a) an inlet port for the inlet pressure from the safety relief valve via said inlet line;
(b) an outlet port adapted to be connected to the pressure relief valve for providing the control pressure thereto for operation of the safety relief valve via the outlet line; and
(c) an exhaust port adapted to be selectively connected to said outlet port for reducing the control pressure at said outlet port.

3. The apparatus of claim 2 including means restricting the flow to said outlet port from said inlet port through a restrictor means wherein said restrictor means comprises the only path therebetween.

4. The apparatus of claim 3 wherein said restrictor means comprises a needle orifice.

5. The apparatus of claim 3 wherein said restrictor means comprises an adjustable needle orifice.

6. The apparatus of claim 2 wherein said piston means and said valve seat in said valve body close flow to said exhaust port, and further wherein said valve body supports a fluid flow path to said outlet port originating with said inlet port, and said fluid flow path flows through a flow restrictor means to reduce the rate of flow therethrough.

7. The apparatus of claim 1 further including a protruding plunger extending axially from said piston and wherein said piston has an exposed end face serving as said second area, and wherein said first area is exposed shoulder facing away from said end face and said first area is reduced in size by said plunger protruding from said shoulder.

8. The apparatus of claim 7 further including first and second chambers in said cylinder isolated by a seal means therebetween, and wherein said first and second chambers enclose said piston respectively exposing said first and second area of said piston for fluid pressure introduced into said first and second chambers.

9. The apparatus of claim 8 further including means in said cylinder limiting axial movement of said piston, and further wherein said guide means includes an opening sealingly receiving said plunger therein and wherein said opening positions said plunger to enable said plunger to extend from said opening for visual inspection.

10. In an adjustable pilot valve having an inlet port in a valve body, an exhaust port and an outlet port wherein an inlet pressure to be monitored is supplied to said inlet port and a control pressure is formed by said pilot valve and put through said outlet port, and said pilot valve includes a valve element responsive to a resilient means acting in one direction on said valve element and is pressure responsive to a force acting in the opposite direction which force is dependent on the inlet port pressure, the improvement in said pilot valve comprising visually observable indicator means forming a visual indication of the operative state of said pilot valve dependent on the control pressure formed by said pilot valve, and wherein said pilot valve raises or lowers the control pressure dependent on the adjustment of said pilot valve and wherein said indicator means includes:
(a) a cylinder;
(b) a piston slideably located in said cylinder;
(c) said piston being located in said cylinder to define first and second spaced chambers therein;
(d) seal means in said cylinder cooperatively sealing with said piston to isolate said first and second chambers from one another against leakage along said cylinder;
(e) first and second fluid flow conduits connected to said first and second chambers to communicate fluid under pressure thereto, wherein said first and second fluid flow conduits are connected to receive fluid from said inlet and outlet ports; and
(f) first and second areas oppositely exposed to fluid pressure in said first and second chambers to form opposing forces facing on said piston to move said piston dependent on the relative forces.

11. The apparatus of claim 10 further including a protruding plunger attached to said piston and which plunger extends through an opening means extending from said cylinder, and further including seal means around said plunger to prevent leakage along said plunger.

12. The apparatus of claim 11 wherein said plunger is a round and elongate axially centered protruding member on said piston.

13. The apparatus of claim 11 wherein said plunger extends through an encircling externally threaded plug which plug fits into a countersank passage in a body comprising said cylinder and said passage enables assembly of said piston within said body prior to treading said plug into said passage.

* * * * *